(No Model.) 3 Sheets—Sheet 3.
C. THOMAS.
DEVICE FOR OPERATING CARRIAGE DOORS.

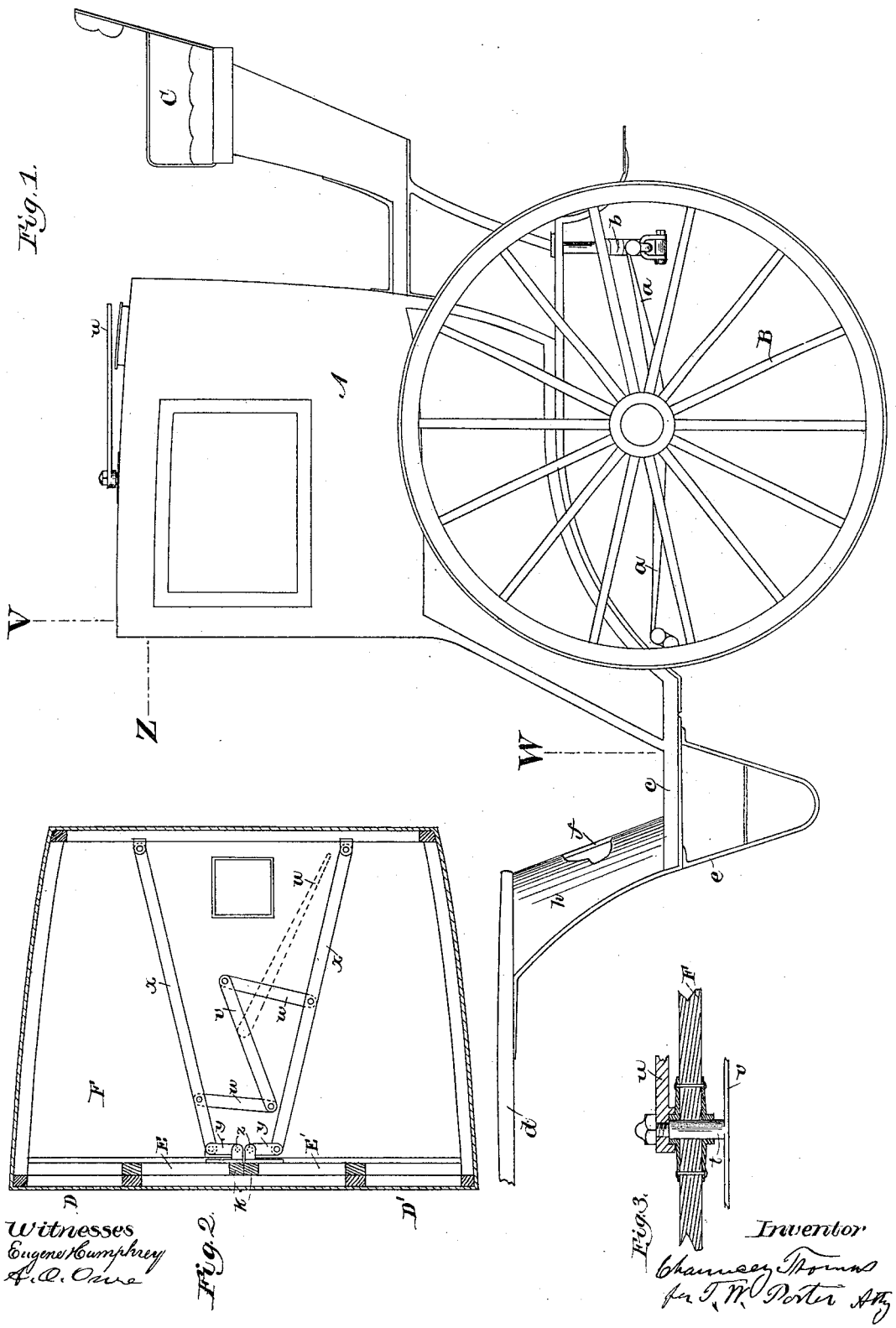

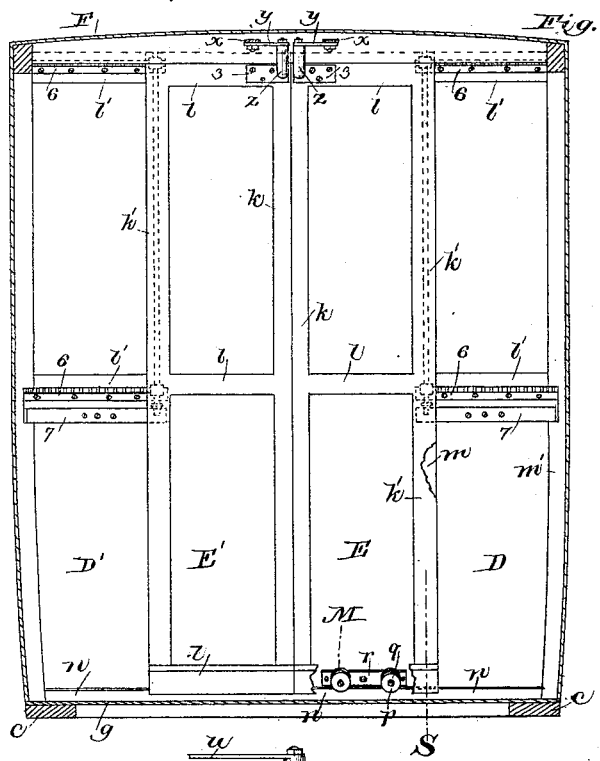
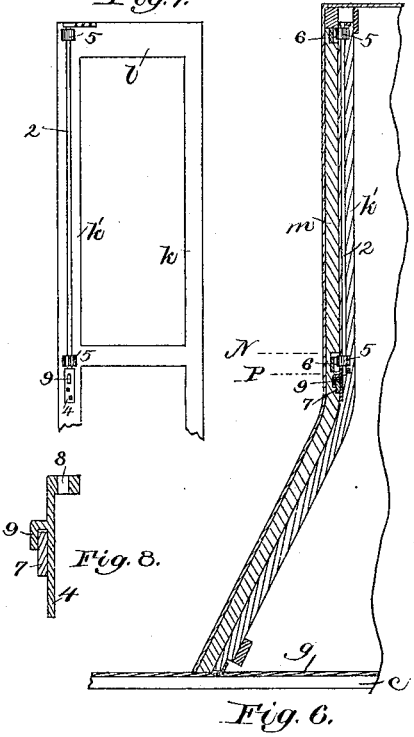
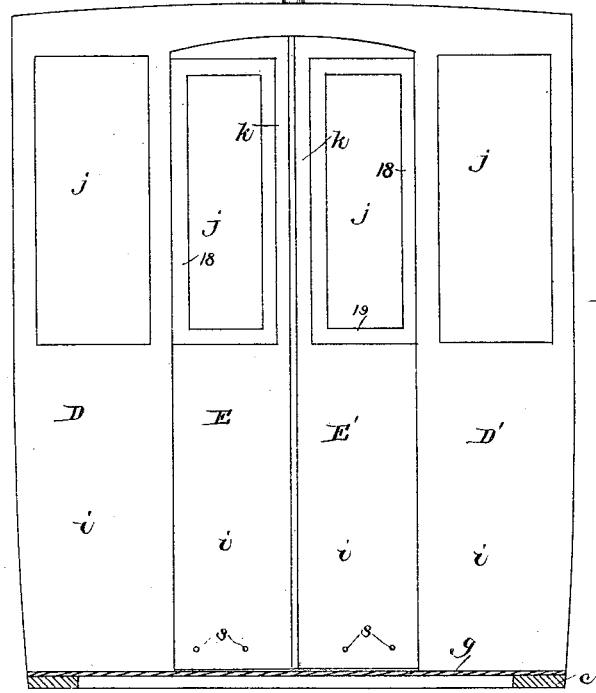
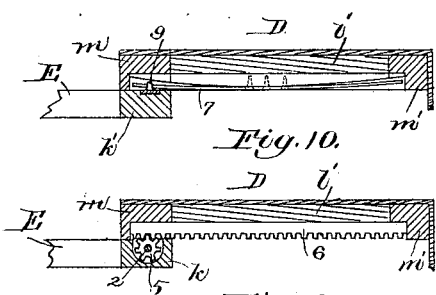

No. 328,731. Patented Oct. 20, 1885.

Witnesses
Eugene Humphrey
A. C. Orne

Inventor
Chauncey Thomas
per T. W. Porter Atty

UNITED STATES PATENT OFFICE.

CHAUNCEY THOMAS, OF BOSTON, MASSACHUSETTS.

DEVICE FOR OPERATING CARRIAGE-DOORS.

SPECIFICATION forming part of Letters Patent No. 328,731, dated October 20, 1885.

Application filed June 17, 1885. Serial No. 168,939. (No model.)

*To all whom it may concern:*

Be it known that I, CHAUNCEY THOMAS, of Boston, in the county of Suffolk and State of Massachusetts, have invented a new and useful Improvement in Carriages, which will, in connection with the accompanying drawings, be hereinafter fully described and specifically defined in the appended claims.

Figure 12:
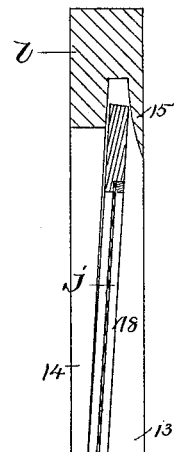
Figure 13:
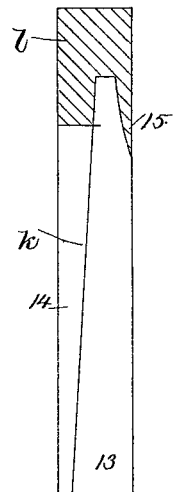
Figure 14:
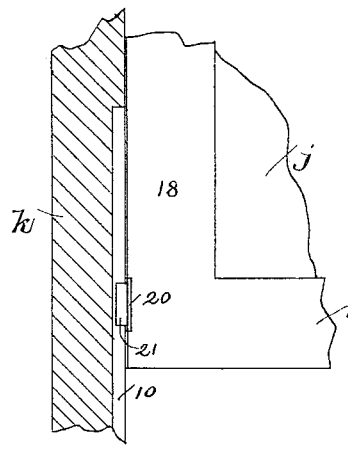
Figure 15:
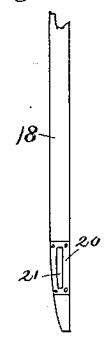
Figure 16:
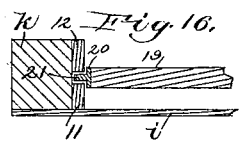
Figure 11:
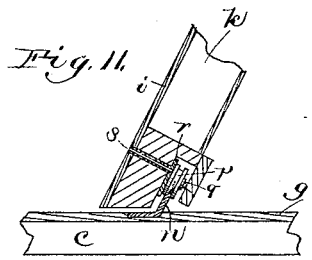
Figure 17:
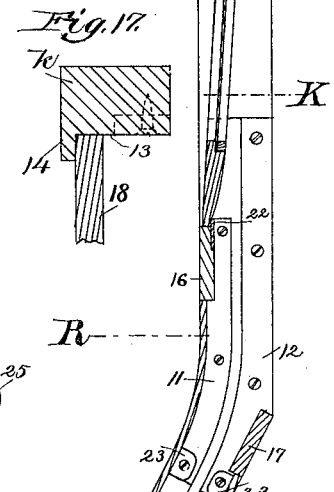

Figure 1 is a side elevation of a "Hansom cab," so called, with my invention thereto applied. Fig. 2 is an inverted sectional plan view, the section being horizontal and taken as on line Z Z, Fig. 1, and the plan showing all above that line. Fig. 3 is a detached vertical section taken on line X, Fig. 2, through the top of the cab, and portions of the devices by which the doors are opened and closed. Fig. 4 is a sectional elevation, the section being taken as on line W W, Fig. 1, through the side sills and floor of the body, and the view being from the left in that figure. Fig. 5 is also a sectional elevation, the section being taken as on line V V, Fig. 1, and the view as from the right in that figure. Fig. 6 is a vertical section taken as on lines S, Figs. 4 and 5, and as viewed from the right therein. Fig. 7 is a detached front elevation of the upper portion of one of the doors, taken as viewed from the left in Fig. 6, with the jamb or side bar of the doorway removed, and showing the controlling-pinions and their shaft in position in the stile. Fig. 8 is a detached enlarged central vertical section of the lower pinion-support and clamping-iron, viewed as from the right in Fig. 7. Fig. 9 is a sectional plan view, the section being taken as on line N, Fig. 6, and the view as from above that line. Fig. 10 is a view like Fig. 9, the section being taken as on line P, Fig. 6. Fig. 11 is a detached vertical section taken as on line M, Fig. 5, through the bottom of the door, and the devices upon which it moves. Fig. 12 is a side elevation of the right-hand stile of one of the doors, the horizontal rails or bars, which unite it with the other stile, being shown in transverse section, the side bar of the sash being shown in elevation, while the top and bottom rail thereof are shown in transverse section, said sash being shown as when raised to close the opening in the door. Fig. 13 is a view like Fig. 12, with the exception that the sash is shown as lowered to leave an open space in the top of the door. Fig. 14 is a detached front sectional elevation, showing a part of the door-stile in longitudinal section, and a portion of the sash as in connection therewith. Fig. 15 is an edge elevation of the lower portion of the side bar of the sash, viewed as from the left in Fig. 14, and showing in place thereon the metallic guiding-plate by which it is held in position in the door-stiles when being raised and lowered. Fig. 16 is a horizontal section taken as on line R R, Figs. 12, 13, 15, through the door-stile, its metallic guide-plates, the lower rail of the sash, and its metallic guide-plate, and as when the lower rail of the sash is at the point indicated at R in Figs. 12, 13, when the sash is being raised or lowered. Fig. 17 is a transverse section taken on line K, Fig. 12, and showing by dotted lines the position of guide-plate 11 therein.

My invention relates more especially to that class of carriages known as "Hansom cabs;" and it consists in features of novelty hereinafter fully described, and pointed out in the claims.

Referring to the drawings, A represents the body; B, the wheels; C, the driver's seat; D, the right-hand fixed section of the front of the body; D', the corresponding left-hand section; E, the right-hand section or half of the door, and E' the left-hand section thereof.

The body is supported by means of the usual side springs, $a$, secured to the axle at their center and shackled to the body at their front end, while at their rear end they are shackled to the ends of cross-spring $b$, which is at its center secured to the body in the usual and well-known manner. The front ends, $c$, of the side sills of the body are united with shaft $d$ by irons $e$ and $f$ in the manner well known, a curtain or boot, $h$, extending from the curved rear portion of the shafts to platform $g$ upon sills $c$.

As all the foregoing parts, with the exception of the doors, are of well-known construction, further reference thereto is not deemed necessary, except as may be requisite in explaining the construction of the doors and the devices by which they are actuated.

Said doors, as also the fixed side sections, D D', of the body, are preferably formed with the lower wooden panels, $i$, and upper glass panels, j, which latter are respectively inclosed within and supported by the stiles or side bars, K K', and horizontal bars l of the doors, and the vertical bars m and horizontal bars l' of the sections D D', as shown, the glass in the doors being secured in a sash, as shown and hereinafter claimed. Said doors, which are arranged to respectively move to the right and left by sliding behind sections D D' when being opened and closed, are mounted and moved upon the steel bar n by means of grooved rolls p, journaled on studs q, formed upon supporting-plate r, secured to lower rail, l, of the doors. Upon said plate, opposite to studs q, are formed the studs s, which extend through bottom rail, l, and panel i of the door, as shown in Figs. 4, 11, and thereby serve not only to relieve the securing-screws passing through plate r into rail l from vertical strain, but by being hollow, as shown, serve as the means of lubricating the studs q and rolls p, as oil may be introduced through said studs, from whence it falls directly upon studs q, as will be apparent from an inspection of said Fig. 11.

For the purpose of enabling the driver to open and close the doors when in his place in seat C, I employ the following devices: A stud, t, supported by suitable washers, as shown in Fig. 3, extends up through roof F, and is there provided with a lever, u, which is rigidly secured to the stud, so as to rotate the same, and is so arranged as to be within easy reach of the driver when in his said seat. Upon the lower end of said stud t is formed a bar, v, which constitutes a differential lever, the ends of which are respectively connected with levers x (whose fulcra or pivots are at the rear part of the top, as shown in Fig. 2) by means of links w at such distance between their respective fulcra and free ends as will compensate for the unequal length of the arms of bar v. The front or moving ends of levers x are connected by link y with studs z, respectively secured by their plates 3 to the top rails or horizontal bars of the doors, as shown in Figs. 2, 5.

It will be obvious that the driver, by actuating lever u, can readily, through the described mechanism, open the doors by sliding them, respectively, behind the sections D D', or can close them by a reverse movement of said lever, provided the force thus exerted at the top of the doors will move the same bodily—that is, with a parallel movement at their top and bottom—which result I secure by means of the following described devices:

In the upper portion of bar k of each door I form a longitudinal groove to receive a small arbor, 2, the upper ends of which are journaled in lugs projecting inward from plates 3, as shown in Fig. 6, while their lower ends are secured in hole 8 in the plates 4, secured at central bar, l, of the doors, Figs. 6, 7, 8. Upon said arbors, adjacent to their described bearings at each end, I rigidly secure a pinion, 5, which enmeshes with racks 6, secured to the upper and middle horizontal bars l' of the fixed sections D D', as shown in Figs. 5, 6, 9.

It will be obvious that when force is exerted at the top of the doors by the described means in a direction to either open or close them, that when the top of the doors begin to move, the pinions at the top end of the arbors, by reason of their engagement with the racks, will be thereby rotated, and their rotation will cause the corresponding rotation of the pinions at the lower ends of the arbors, which by their engagement with their racks will move the lower portion of the door coincidently with the top, and hence the doors must always move, in either direction, with their inner or meeting edges parallel each with the other.

For the purpose of securing said pinions in engagement with their respective racks, and also to hold the doors in position and to secure them from rattling or noise when either opened or closed, I secure to the inside of sections D D', near the middle rail, i', a curved spring, 7, secured at its middle, but free at its ends, as shown in Fig. 10, and a hook, 9, Figs. 6, 8, 10, formed on plate 4, grasps said spring, and when, by the described sliding movement of the door, said hook approaches either end of the spring it draws it into a straight line or toward the door, whereby the force and resistance of the spring is then exerted to hold the door closely against the fixed section and thus prevent its rattling.

Another advantage of the curved spring is that whether the door be open or closed, the spring aids in moving it in the opposite direction, as its force acts obliquely to force the door to so move that its hook 9 shall be at or near the lineal center of the spring, as there no force whatever is exerted by the hook upon the spring, except to hold the door loosely in place and the pinions and racks in mesh.

In order that the windows (shown in position in Figs. 4, 12,) may by a sliding movement be raised in position to close the openings in the top of the door, as shown in said figures, or may be lowered, as shown in Fig. 13, notwithstanding the relative angles of the top and bottom portions of the doors, I employ the following devices: In the lower half or portion of the door-stiles I form a longitudinal groove, 10, Figs. 12, 13, which extends upward to near the curved portion of the stile, when it is extended by means of the curved metal plates 11 12, as shown, the outer face or plane of said plates being flush with that of the stile, both below them, and at 13 above them, which latter portion serves as the lateral guideway of the side bars, 18, of the sash. At the front side of the stile the usual guard-lip, 15, projects from face 13, as shown in Figs. 12, 13, 17, said lip terminating at foot-rail 16, on which the sash rests when raised, as shown in Fig. 12, in the usual manner, the sash being held close against lip 14 by the usual thin metal plate, 22, secured to the back side of rail 16, and by a short guard-lip, 15, at the top of the stile. The lower end of the sash is interlocked in groove 10 by means of a plate, 20, formed with fin or flange, 21, one of said plates being secured to the side bar at each side of the sash, and said fin 21 being of such length and thickness as to readily pass the curve in the groove between metal plates 11 and 12.

In practice, if the sash be already raised, as shown in Fig. 12, and it is desired to lower it, it is raised by means of its flexible handle 21, so as to free it from plate 22 of foot-rail 16, when the lower end is moved rearward till fins 21 bear against the front edge of plates 12, when the sash is lowered; and as it will be free of guard-rib 15 before its fins 21 enter the curved portion of the groove, therefore the top of the sash may be moved rearward just fast enough to allow said fins to move freely in the grooves as the sash descends. When the sash is fully lowered, as shown in Fig. 13, its lower rail rests on the horizontal bar of the door, which unites the two stiles or vertical side bars thereof, as shown in Fig. 13, while the upper end of the sash is held between bosses 23, respectively formed upon and projecting inward from the faces of plates 11 and 12; or it may rest upon bar 17, which extends across the door from stile to stile; but the bosses are preferable, the sash and its glass being protected, when thus lowered, by outer panel, $i$, and inner casing, 24.

If the sash be lowered, as shown in Fig. 13, and it is desired to raise it, the movement is the reverse of that described for lowering it, the sash moving in a line which is a prolongation of that occupied by it when lowered, till fin 21 enters the curved part of the groove, when the top of the sash will be moved gradually forward, so that it will, by the controlling action of said fins, automatically enter between lips 14 15 when raised to the lower end of lip 15. Said fin 21 is in its front lineal face formed with a curve corresponding to the sharpest curve in the rearward edge of guiding-plate 11, as shown in Fig. 15, in order that it may at its ends fit closely between plates 11 12 and yet slide freely between them. If preferred, said plate 20 may, instead of fin 21, have formed upon it, near its ends, two studs, on which, if desired, may be secured rotating handles to relieve it of friction.

I claim as my invention—

1. The combination, with the sliding door and the guiding-bar $n$, of plate $r$, formed with studs $q$, having rolls $p$ secured thereon, and the perforated studs $s$, arranged above and on the opposite side of said plate from studs $q$, substantially as specified.

2. The combination, with the sliding doors having an upper and lower portion at an angle relatively to each other, of the arbors duly mounted in one of said portions and carrying pinions at each end, arranged, respectively, near the end and middle of the door, the racks arranged to be engaged by said pinions, and operative mechanism attached to the top of the doors, by which to open and close the same, substantially as specified.

3. The combination, with the doors E E', constructed and arranged to slide by a parallel movement, as specified, and the lever $u$, arranged above the top and secured to stud $t$, entering within the body, of a system of levers connected with said stud and the doors, and adapted and arranged, when actuated by said lever, to open or close the same, substantially as specified.

4. The combination, with doors E E', arranged to slide, as described, of levers $x$, links $w$ and $y$, and levers $u$ $v$, united by stud $t$, all substantially as specified.

5. The combination, with the sliding doors, of curved spring 7 and the engaging-hook 9, substantially as specified.

6. The combination, with a door formed with its upper and lower portions at an angle relatively to each other or with a vertically-curved plane, of a sash interlocked at its lower end with and arranged to slide in the side frame or stiles of the door and to be swung out of contact with the door at its upper end, whereby said sash may be moved by sliding from the top to the bottom of the door, and vice versa, substantially as specified.

7. The combination, with the angular door-stiles formed with groove 10 in the lower portion, and with the front lip, 14, and rear short lip, 15, of the sash provided at its lower end with interlocking plates arranged to move in the grooves of the stiles and to allow the top of the sash to swing out of plane with the stiles, substantially as specified.

CHAUNCEY THOMAS.

Witnesses:
T. W. PORTER,
EUGENE HUMPHREY.